United States Patent [19]

Edwards

[11] 4,452,316

[45] Jun. 5, 1984

[54] POWER HOE WITH RECIPROCATING BLADES IN SLIDING ENGAGEMENT WITH EACH OTHER

[76] Inventor: John W. Edwards, 1211 Florida Ave., Natrona Heights, Pa. 15065

[21] Appl. No.: 294,135

[22] Filed: Aug. 19, 1981

[51] Int. Cl.³ .............................................. A01B 1/10
[52] U.S. Cl. ...................................... 172/41; 30/277; 173/51; 172/48
[58] Field of Search ..................... 172/41, 54.5, 84, 48, 172/86; 173/50, 51, 101, 114, 139; 30/171, 172, 272 A, 277, 272 R; 83/697; 128/312

[56] References Cited

U.S. PATENT DOCUMENTS

| | | | |
|---|---|---|---|
| 2,168,703 | 8/1939 | Dziedzic et al. | 30/272 A X |
| 2,312,043 | 2/1943 | Martin | 30/272 R |
| 2,422,005 | 6/1947 | Frank | 30/272 R |
| 2,781,578 | 2/1957 | Guilfoyle | 30/272 A |
| 3,153,852 | 10/1964 | Freeman | 30/272 A |
| 3,203,095 | 8/1965 | Nelson | 30/272 A |
| 3,337,952 | 8/1967 | Rosen | 30/272 A |
| 3,432,702 | 3/1969 | Chambers | 30/272 A X |
| 3,548,953 | 12/1970 | Richardson, Sr. | 172/41 |
| 4,003,436 | 1/1977 | Foster et al. | 172/41 |
| 4,122,902 | 10/1978 | Alexander | 172/41 |
| 4,304,047 | 12/1981 | Jesionowski | 30/277 |

FOREIGN PATENT DOCUMENTS

| | | | |
|---|---|---|---|
| 227833 | 3/1910 | Fed. Rep. of Germany | 172/48 |
| 1177046 | 8/1964 | Fed. Rep. of Germany | 30/169 |
| 2040210 | 8/1980 | United Kingdom | 30/272 A |

Primary Examiner—Richard T. Stouffer
Attorney, Agent, or Firm—Webb, Burden, Robinson & Webb

[57] ABSTRACT

A power hoe includes a power source, two substantially planar hoe blades positioned in apposition to one another and power connecting structure to synchronizingly reciprocate the blades in sliding engagement relative to each other. The sliding engagement causes the blades to be self-cleaning. Orientation of the tapered end of each hoe blade perpendicular to the direction of reciprocation effects a ground penetrating action of the hoe blades.

7 Claims, 9 Drawing Figures

POWER HOE WITH RECIPROCATING BLADES IN SLIDING ENGAGEMENT WITH EACH OTHER

FIELD OF THE INVENTION

My invention relates to a gardening tool and, more particularly, to a power hoe having two reciprocating blades for tilling the soil.

DESCRIPTION OF THE PRIOR ART

The standard procedure for preparing a plot of ground for planting either vegetables or flowers includes preparation of the soil by well known means such as plowing, spading, discing or otherwise breaking up the soil prior to the actual planting operation. Thereafter, as the seeds germinate and/or the plants grow, it is necessary to remove weeds and the like. It is further desirable to maintain the soil in a loose, cultivated condition for better moisture control and growing conditions. These conditions are applicable to trees, shrubs and perennials as well as young plants. The breaking up of this soil, generally referred to as tilling, is usually done by hoeing.

The standard hoe comprises a handle and a blade extending at some angle on the order of 90° to the handle and considerable labor is required in the operation of the hoe to achieve the desired soil conditions. Large gardens and commercial operations often employ various forms of power equipment which passes through the rows of the plants breaking up the soil therebetween. This equipment, such as a rotor tiller, is expensive and is generally not capable of weeding or breaking up the soil close to the plants without causing damage to the plants.

Various forms of power hoes have been developed for performing the dual function of weeding and breaking up the soil. Representative of such power hoes are those disclosed in U.S. Pat. No. 4,122,902 and British Pat. No. 842,871. Other forms of power operated hand cultivators employing vertically disposed cultivator tines which oscillate to break up the soil are disclosed in U.S. Pat. No. 4,003,436. And further a vibrating or reciprocally movable blade for purposes of digging holes in the ground is disclosed in U.S. Pat. No. 3,548,953.

SUMMARY OF THE INVENTION

I have discovered a power operated tool which is hand operated and which effectively weeds, cultivates and otherwise tills the soil in a very effective manner. Not only is it safe to operate, but is includes self-cleaning features which make it effective in a large number of soil conditions. The said tilling capability of a large piece of equipment is combined with the precision performance of a hand hoe. The work element is easily interchangeable depending on the job condition. The principle of operation is just as applicable to a small hand held hoe as it is to a gang of such hoes connected in parallel behind a tractor.

My power hoe includes a pair of hoe blades with each blade being substantially planar. The hoe blades, each of which generally includes a shank portion and a blade portion, are positioned in apposition to each other with the blade portions being in sliding engagement to one another. The hoe blades are caused to reciprocate relative to each other in a synchronized manner. Preferably, the blades are configured and formed so that in a first position a distal end of the first blade extends beyond a distal end of the second blade and transcends the plane thereof. In a second position the blades are in matching side-by-side relationship with the distal ends in engagement and in a third position the second blade extends beyond the distal end of the first blade and transcends its plane. The blades are constantly reciprocated between these positions. In a preferred embodiment, the blades connect to a pair of shafts housed within a tubular member. The tubular member connects to a power source which includes a means to reciprocate the shafts within the tubular member.

BRIEF DESCRIPTION OF THE DRAWINGS

FIG. 4 is a section taken along section lines IV—IV of FIG. 1;

FIG. 5 is a section taken along section lines V—V of FIG. 1;

FIGS. 6, 7 and 8 are exaggerated schematics showing the two hoe blades at the extreme positions and the common position during reciprocation.

DESCRIPTION OF THE PREFERRED EMBODIMENTS

Figure 1:
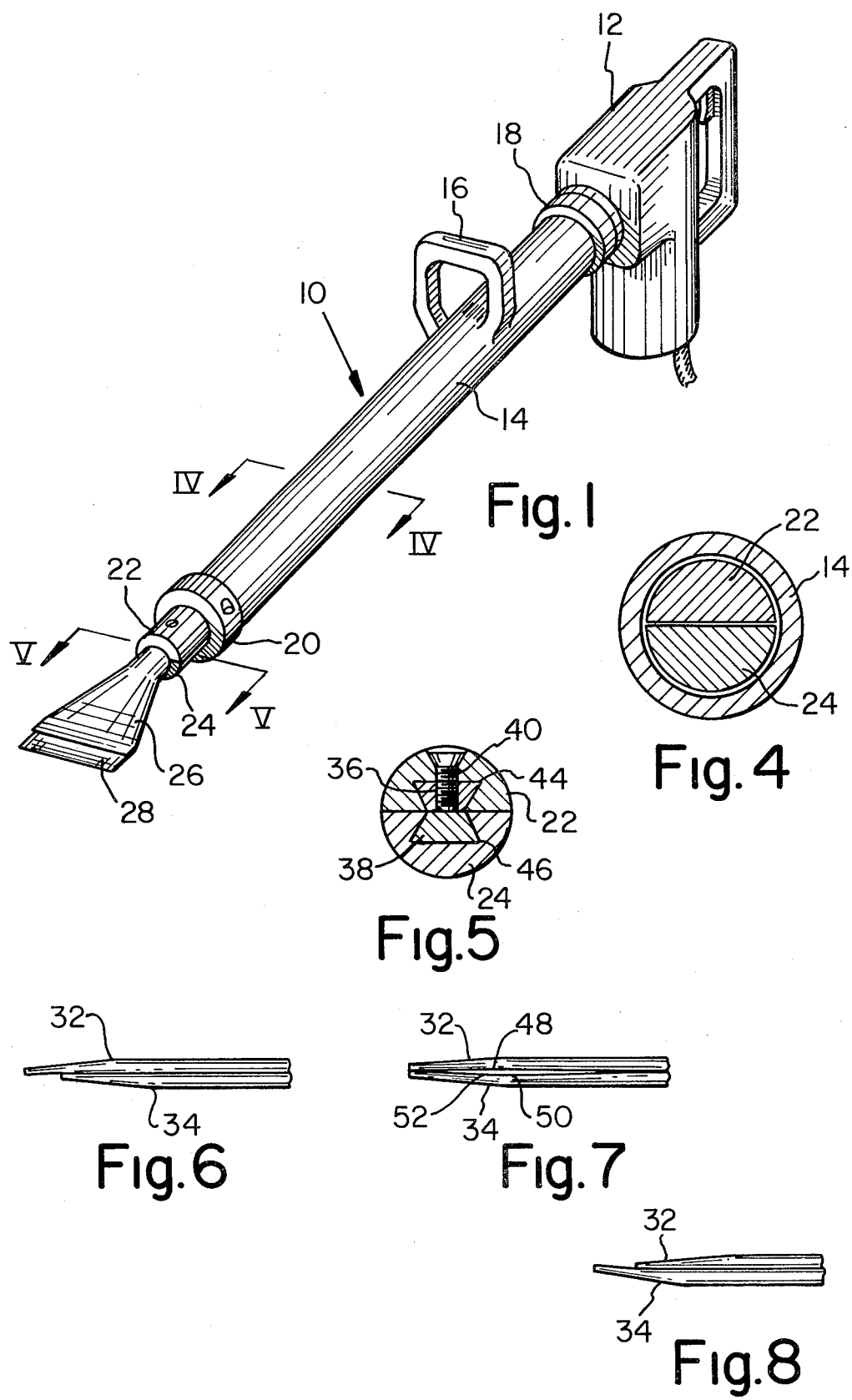
FIG. 1 is a perspective view of my power hoe.

My power hoe, generally designated 10, includes a motor housing 12, a tubular member 14 connected thereto and a handle 16 extending from the tubular member to permit proper handling of the tool during operation, FIG. 1. Collars 18 and 20 are provided at opposing ends of tubular member 14 to provide proper reinforcement and accommodate bushings as will be described in more detail hereinafter. A pair of hoe blades 26 and 28 are connected to shafts 22 and 24, respectively which are in turn housed within tubular member 14.

It will be recognized that motor housing 12 may house an appropriate gasoline or electric motor, the details of which do not form a part of this invention. It will likewise be recognized that a number of arrangements may be employed to cause reciprocation of the shafts 22 and 24 and that these reciprocating means are operable from the power source through appropriate power connecting means such as centrifugal or manual clutching. Likewise, the power source may provide a constant speed or may be of the variable speed type. All of these features are well known in the art of power tools. The reciprocating dual blades may even be connected to other types of power equipment such as a chain saw or the like with appropriate modifications to the coupling means.

Figure 2:
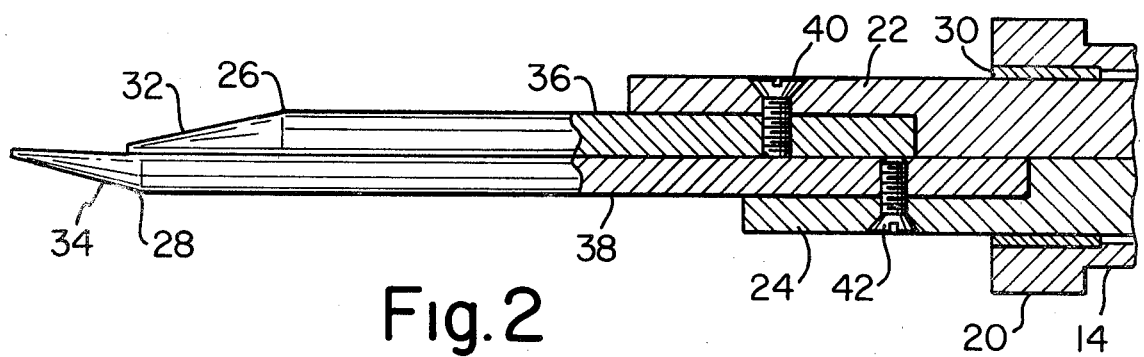
FIG. 2 is a view, partly in section, showing the hoe blades connected to their respective shafts.

Hoe blades 26 and 28 are each generally planar although as described hereinafter a slight curvature or angulation along the inner surface of each blade provides optimum results. Blade 26 includes a tapered blade section 32 which penetrates into the ground and a shank 36 for connecting to shaft 22, FIG. 2. Likewise, blade 28 includes a tapered blade section 34 and a shank 38 for connection to shaft 24. The blade section of each hoe blade is oriented perpendicular to the direction of reciprocation of the hoe blades.

In general, the shafts 22 and 24 are semi-circular in cross section and are housed within tubular member 14, FIG. 4. It will be recognized that rectangular or other polygonal shapes may be utilized for the shafts and tubular member. The blade section end of shank 22 includes a trapezoidal recess or keyway 44, FIG. 5. Shank 36 is trapezoidally configured for mating engagement with the keyway 44. An appropriate countersunk machine screw 40 secures the shaft 22 to the hoe blade shank 36. In a similar manner, shaft 24 includes a keyway 46 to accommodate in mating engagement the trapezoidally configured shank 38 of blade 28. A machine screw (not shown) likewise connects the shaft 24 and shank 38.

Figure 3:
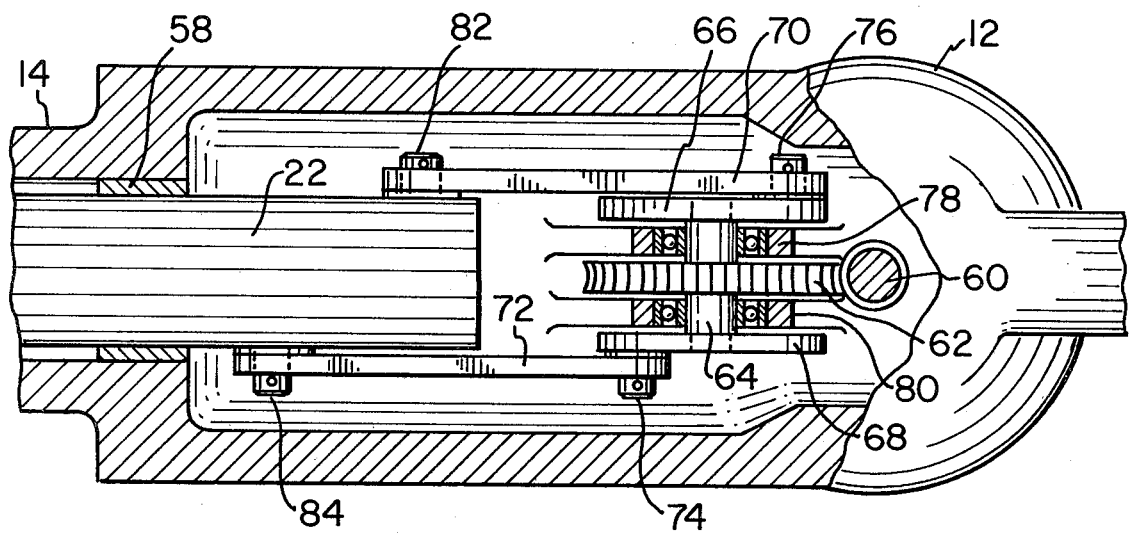
FIG. 3 is a broken away view, partly in section, showing one means of effecting the reciprocation of the blades.

One mechanism for causing reciprocation of the shafts 22 and 24 is illustrated in FIG. 3. A worm shaft 60 is connected on the end of the appropriate motor shaft. Clutch means such as a slip clutch (not shown) is operable between the motor shaft and the worm shaft. Worm gear 62 is engageable with the worm shaft 60 and a shaft 64 extends through worm gear 62 and is locked thereto. Shaft 64 is keyed to throw disc 66 and throw disc 68 at its respective ends. Shaft 64 is engaged by appropriate bearings 78 and 80, respectively on opposing sides of worm gear 62.

Throw disc 66 is connected to crank 70 by connecting pins 76 at one end thereof. At the opposing end, crank 70 is connected to shaft 22 by connecting pin 82. In a similar fashion connecting pin 74 connects the crank 72 to the throw disc 68 at one end thereof and crank 72 connects to shaft 24 through pin 84 at the other end thereof.

Bushing 58 accommodates the shafts 22 and 24 and provides support at one end thereof, FIG. 3. Bushing 30 supplies support at the other end of the shafts 22 and 24, FIG. 2. In practice, bushing 30 and collar 20 may be of the split type to allow for rapid interchangeability of the hoe blades.

Engagement of the worm gear 62 by the worm shaft 60 causes the respective cranks 70 and 72 to move in synchronized reciprocation, which synchronized reciprocation is translated to the shafts 22 and 24 and to the blades 26 and 28, respectively connected at the ends thereof.

The blades themselves are positioned in apposition to one another, FIGS. 6-8. The inner surface 48 of blade section 32 is concavely curved slightly. In a similar manner inner surface 50 of blade section 34 is concavely curved slightly. The axial extent of the curvature need only extend through a distance approaching the stroke of reciprocation. During operation, the blades are in sliding engagement with one another and in the extreme position of travel the blade section 32 overlaps and transcends the plane of the blade 34, FIG. 6. At the other extreme position, the end of blade section 34 overlaps and transcends the plane of blade section 32, FIG. 8. When the blades are in a common position, the extreme blade tips engage one another and a slight gap 52 is formed between the curved surface 48 of blade section 32 and 50 of blade section 34, FIG. 7.

Each blade may be configured so that the cutting section is at a slight angle to the shank at least along the inner surface thereof. When assembled, for example by tightening a split collar 20, the respective blade tips are placed in engagement as described above. The blades, in effect, are in slightly biased relationship.

The purpose of the blade configuration is two-fold. In the first instance, because the blade tips are always in engagement, small dirt particles or foreign matter is prevented from getting between the blades. Of equal importance is the self-cleaning effect caused by the sliding engagement of the blades. Soil which sticks to one blade is brushed off by the sliding engagement of the other blade, therefore keeping the blades clean at all times.

Figure 9:
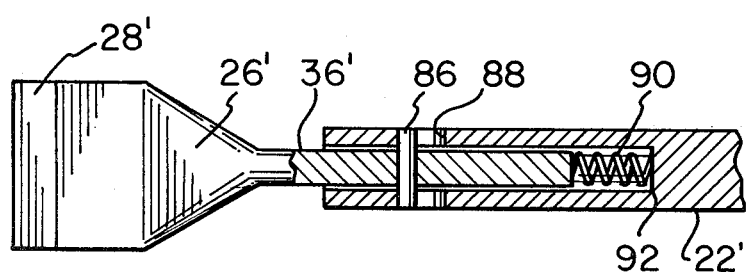
FIG. 9 shows a modified form of the blades employing a shock absorber.

An alternate embodiment is shown in FIG. 9 where similar parts are identified with the same numeral followed by a prime. In the embodiment of FIG. 9, blades 26' and 28' are configured as in the earlier embodiment. Blade shank 36' fits in a recess 92 in shaft 22' and is connected thereto by means of a roll pin 86 which is operable in a travel slot 88 of the shaft 22. A spring 92 is positioned between the shank 36' of the hoe blade and the end of the recess 90. Blade 28' is likewise connected. This gives a shock absorbing effect to the movement of the blades as they reciprocate.

The power hoe is operated by positioning it at an angle to the ground and moving it slowly backward along the ground as the hoe blades are activated. The relative movement of the hoe blades causes penetration into the ground and the slower the power hoe is moved rearward, the greater frequency will be the penetration in the ground, thereby assuring that roots of weeds and other undesirable plants can be chopped and loosened at their roots. Blades are easily interchanged depending on the requirements of the job. The above described arrangements can be employed on a hand-held portable power hoe or can be used in gang style on a power driven vehicle.

Numerous variations of this structure and other embodiments of the invention will be apparent to those skilled in the art and all such variations and embodiments are covered by the independent claims.

I claim:
1. A power hoe comprising:
A. a housing accommodating a power source and associated means for reciprocating;
B. a tubular member extending from said housing;
C. a pair of shafts housed within the tubular member, each of said shafts connected at a first end to the reciprocating means; and
D. a pair of hoe blades adapted for weeding and breaking up soil, each hoe blade being substantially planar and comprising a shank and a cutting section, said cutting section being tapered at its distal end, said shank of each hoe blade connected to a second end of one of said shafts, said hoe blades positioned so that the cutting sections are in sliding engagement, said cutting sections being formed along their engaging surfaces so that the hoe blades are biased one against the other, said cutting section of said hoe blades being configured and formed so that in a first position the distal end of a first of said hoe blades extends beyond the distal end of the second of said hoe blades and transcends a plane thereof, in a second position said hoe blades are in matching side-by-side relationship with said distal ends in engagement, and in a third position said second hoe blade extends beyond the distal end of the first hoe blade and transcends a plane thereof, said hoe blades being constantly reciprocated between said first, second and third positions by said reciprocating means, and said shafts and blades being reciprocated in sliding engagement with each other and with respect to the tubular member by said reciprocating means, with the tapered distal end of each said hoe blade oriented perpendicular to the direction of reciprocation and extending linearly an extent greater than the cross sectional extent of each said shank so as to effect a ground penetrating action of said hoe blade cutting sections.

2. The power hoe of claim 1 including shock absorbing means positioned between the blades and shafts.

3. The power hoe of claim 1, said cutting section being concavely formed.

4. The power hoe of claim 1, said shafts being semicircular in cross section and having juxtapositioned planar diametrical surfaces.

5. The power hoe of claim 4, each of said planar surfaces including a recessed keyway to matingly engage the shank of the opposing one of said hoe blades.

6. The power hoe of claim 1 including a bushing mounted within each end of the tubular member to slidingly accommodate the shafts.

7. The power hoe of claim 1, said reciprocating means comprising a worm shaft engageable with the power source, a worm gear engageable with the worm shaft, a shaft of the worm gear connected at each opposing end to a throw disc, each of said throw discs connected to one end of a crank, the other end of said crank being connected to the shank of one of said hoe blades.

* * * * *